(12) United States Patent
Harrison et al.

(10) Patent No.: US 10,869,067 B2
(45) Date of Patent: Dec. 15, 2020

(54) METHOD FOR DETECTING A LIVE ADAPTIVE BIT RATE STREAM

(71) Applicant: Openwave Mobility Inc., Redwood City, CA (US)

(72) Inventors: Declan Harrison, Belfast (GB); Christopher Brown, Newtownards (GB)

(73) Assignee: Openwave Mobility Inc., Redwood City, CA (US)

( * ) Notice: Subject to any disclaimer, the term of this patent is extended or adjusted under 35 U.S.C. 154(b) by 42 days.

(21) Appl. No.: 15/647,760

(22) Filed: Jul. 12, 2017

(65) Prior Publication Data

US 2018/0020246 A1   Jan. 18, 2018

(30) Foreign Application Priority Data

Jul. 15, 2016 (GB) .................................. 1612331.7

(51) Int. Cl.
  *H04N 21/234*   (2011.01)
  *H04L 29/08*    (2006.01)
  (Continued)

(52) U.S. Cl.
  CPC ... *H04N 21/23418* (2013.01); *H04L 65/4069* (2013.01); *H04L 65/4084* (2013.01);
  (Continued)

(58) Field of Classification Search
  CPC .... H04L 65/4069; H04L 67/02; H04L 65/601
  See application file for complete search history.

(56) References Cited

U.S. PATENT DOCUMENTS

| 2010/0235472 A1 | 9/2010 | Sood et al. |
| 2011/0082924 A1* | 4/2011 | Gopalakrishnan ......................... H04L 65/4084 709/223 |

(Continued)

FOREIGN PATENT DOCUMENTS

| EP | 2670109 A1 | 12/2013 |
| WO | 2015035942 A1 | 3/2015 |

OTHER PUBLICATIONS

European Search Report dated Oct. 16, 2017 on related Application No. EP 17181290.2 filed Jul. 13, 2017.

*Primary Examiner* — Chris Parry
*Assistant Examiner* — Steven C Nguyen
(74) *Attorney, Agent, or Firm* — EIP US LLP

(57) ABSTRACT

There is described a method for classifying a dataflow being downloaded to a client over a data network from at least a first server as being a live Adaptive Bit Rate (ABR) stream. The method is implemented by an intermediate network entity between the client and the at least a first server in the data network. The method comprises monitoring a sequence of requests sent from the client and a corresponding sequence of responses sent to the client that pass through intermediate network entity in respect of the dataflow. The monitoring comprises measuring a data size of each response in the sequence of responses and determining, based on the monitoring, that the sequence of responses comprises a pattern of responses that is consistent with that expected of a live ABR stream. The dataflow is the classified in response to said determining, as being a live Adaptive Bit Rate (ABR) stream.

15 Claims, 6 Drawing Sheets

(51) Int. Cl.
*H04L 29/06* (2006.01)
*H04N 21/44* (2011.01)
*H04N 21/4627* (2011.01)
*H04N 21/654* (2011.01)

(52) U.S. Cl.
CPC .......... *H04L 65/601* (2013.01); *H04L 65/602* (2013.01); *H04L 65/605* (2013.01); *H04L 65/80* (2013.01); *H04L 67/02* (2013.01); *H04N 21/44008* (2013.01); *H04N 21/4627* (2013.01); *H04N 21/654* (2013.01)

(56) References Cited

U.S. PATENT DOCUMENTS

| | | | |
|---|---|---|---|
| 2013/0250761 A1* | 9/2013 | Shatzkamer | H04L 47/14 370/235 |
| 2015/0304196 A1* | 10/2015 | Sun | H04L 43/0876 709/219 |
| 2016/0232538 A1* | 8/2016 | Papakostas | G06Q 30/0201 |
| 2016/0277299 A1* | 9/2016 | Kadaba | H04L 12/56 |
| 2016/0294898 A1* | 10/2016 | Wheelock | H04L 65/4076 |

\* cited by examiner

METHOD FOR DETECTING A LIVE ADAPTIVE BIT RATE STREAM

CROSS-REFERENCE TO RELATED APPLICATIONS

This application claims priority under 35 U.S.C. § 119(a) to United Kingdom Patent Application No. GB 1612331.7, filed on Jul. 15, 2016, the entire content of which is incorporated herein by reference.

BACKGROUND OF THE INVENTION

Field of the Invention

The present invention relates to a method for detecting a live adaptive bit rate (ABR) stream, for example, a live HTTP adaptive video stream, being downloaded from a content server to a client.

Description of the Related Technology

Adaptive Bit Rate (ABR) streaming, for example, Hyper Text Transfer Protocol (HTTP) Adaptive Video Streaming (AVS), is a known technique used to stream video (and/or other content) over the Internet and other communications networks.

In order to support ABR streaming, typically, a video server, in a communication network, makes available for download multiple variants of the same video content, each variant having one or more characteristics associated therewith that are different to those of the other versions. For example, the one or more characteristics may relate to video quality, as indicated, for example, by the bit rate, or the resolution that is being used.

Each variant is sub divided into a plurality of consecutive smaller multi-seconds parts known as segments or chunks. Each segment is typically between 2 to 10 seconds of duration. The video server also makes available a so called manifest file (sometimes referred to as a playlist) which contains information (e.g. meta-data) describing each and every available segment which is to be used by a client device in order to play back segments. A manifest file also contains a different pointer to or an address (typically a Uniform Resource Locator (URL)) for each segment of each variant of the video content, or alternatively, a different pointer to an address (again typically a URL) for each version of the video content and a byte range for each different segment within each version. This segment pointer information enables a client device to individually request segments from the server.

Prior to downloading desired ABR video content from the video server, a client device first downloads the manifest file for that video content and uses the manifest file to identify the different available versions of the video content. Based on the information in the manifest file, the client sends sequential HTTP requests for segments of the video content, the segments being of the variant that has a quality level most appropriate for the download bandwidth currently available to the client device.

Typically, in ABR streaming, a HTTP GET request issued over a given TCP connection will only be issued by a client device for the next segment in the sequence when the complete previous segment has been received in a HTTP RESPONSE corresponding to the previous HTTP GET request issued over that given TCP connection.

The client device continuously monitors the available download bandwidth and if it finds that the bandwidth has deteriorated to an extent that it is now too low for the variant of the segments currently being downloaded, the client device starts to request the next segments for displaying the video content from a lower quality variant (if available). Conversely, if it finds that the bandwidth has improved to an extent that it can accommodate a higher quality variant than that of the segments currently being downloaded, the client device starts to request the next segments for displaying the video content from a higher quality variant (if available).

Accordingly, ABR streaming enables a user device to dynamically select the best available stream according to network throughput. Requesting segments one after the other at possibly different resolutions can result in a smoother video experience for a user even if the available bandwidth varies.

Current proprietary implementations of ABR streaming include Microsoft's 'Smooth Streaming' implemented by its Silverlight player, Apple's 'HTTP Live Streaming' (also known as HLS) implemented in its desktop and mobile products, and Adobe's 'HTTP Dynamic Streaming' implemented by its Flash player (v10.1 and later). All three of these implementations support H.264 as a video codec and Advanced Audio Coding (AAC) as an audio codec.

In addition, the standards body 3GPP has defined its standard 'Dynamic Adaptive Streaming over HTTP' and the standards body MPEG its standard 'Dynamic Adaptive HTTP Streaming' (also known as DASH).

ABR streaming may support both Video on Demand (VoD) content and Live content.

In the case of VoD, all of the video content of a given video presentation (e.g. a music video, a movie, etc.) is available at the content server before a client requests to view that presentation. The client first downloads the manifest file for that video presentation and then, as described above, uses the manifest file to request from the content server video segments listed in the manifest file.

In the case of live content (e.g. live video of a sporting event, a live video call, a live video game being played etc.), the video content of a given presentation is made available at the content server immediately after an encoder generates the video content so that a client can view the video content in near real time. The client first downloads an initial manifest file that lists those video segments that are initially available and uses the initial manifest file to start request video segments from the content server. The client then periodically re-requests (i.e. reloads) the manifest file, which is kept updated by the provider with information regarding newly available video segments, and requests video segments using its updated manifest file.

An intermediate network element, for example a proxy server in a cellular communications network, sitting in the data path between an ABR client and an ABR content server can be used by the network operator to manage the ABR stream and/or to collect analytical data about the ABR stream.

In our co-pending application GB1516070.8, there is described a technique by means of which an intermediate network element may detect that data being downloaded from a content server to a client via the intermediate network element is an ABR stream.

In our co-pending application GB1516071.6, there is described a technique by means of which an intermediate network element may control the bandwidth made available for an ABR stream.

It is desirable for such an intermediate server to further be able to detect that an ABR stream is a live ABR stream.

SUMMARY

In a first exemplary embodiment of the invention, there is a method for classifying a dataflow that is being downloaded to a client over a data network from at least a first server as being a live Adaptive Bit Rate (ABR) stream, wherein the method is implemented by an intermediate network entity that is between the client and the at least a first server in the data network, the method comprising;
  monitoring a sequence of requests sent from the client and a corresponding sequence of responses sent to the client that pass through intermediate network entity in respect of the dataflow, wherein the monitoring comprises measuring a data size of each response in the sequence of responses;
  determining, based on the monitoring, that the sequence of responses comprises a pattern of responses that is consistent with that expected of a live ABR stream;
  classifying, in response to said determining, the dataflow as being a live Adaptive Bit Rate (ABR) stream.

In a second exemplary embodiment of the invention, there is an apparatus for an intermediate network entity that is between a client and at least a first server in a data network, the apparatus comprising at least one processor and at least one memory including computer program code, the at least one memory and the computer program code being configured to, with the at least one processor, cause the apparatus at least to perform:
  monitoring a sequence of requests sent from the client and a corresponding sequence of responses sent to the client that pass through intermediate network entity in respect of a dataflow that is being downloaded to the client over the data network from at least the first server, wherein the monitoring comprises measuring a data size of each response in the sequence of responses;
  determining, based on the monitoring, that the sequence of responses comprises a pattern of responses that is consistent with that expected of a live Adaptive Bit Rate (ABR) stream;
  classifying, in response to said determining, the dataflow as being a live Adaptive Bit Rate (ABR) stream.

In a third exemplary embodiment of the invention, there is a computer programme comprising a set of instructions, which, when executed by a processing system at an intermediate network entity that is between a client and at least a first server in a data network, causes the processing system to implement a method comprising at least the steps of:
  monitoring a sequence of requests sent from the client and a corresponding sequence of responses sent to the client that pass through intermediate network entity in respect of a dataflow that is being downloaded to the client over the data network from at least the first server, wherein the monitoring comprises measuring a data size of each response in the sequence of responses;
  determining, based on the monitoring, that the sequence of responses comprises a pattern of responses that is consistent with that expected of a live Adaptive Bit Rate (ABR) stream;
  classify, in response to said determining, the dataflow as being a live Adaptive Bit Rate (ABR) stream.

BRIEF DESCRIPTION OF THE DRAWINGS

Methods and systems for will now be described as an embodiment, by way of example only, with reference to the accompanying figures in which.

Several parts and components appear in more than one Figure; for the sake of clarity the same reference numeral will be used to refer to the same part and component in all of the Figures.

DETAILED DESCRIPTION OF CERTAIN INVENTIVE EMBODIMENTS

A Content Delivery System

Figure 1:
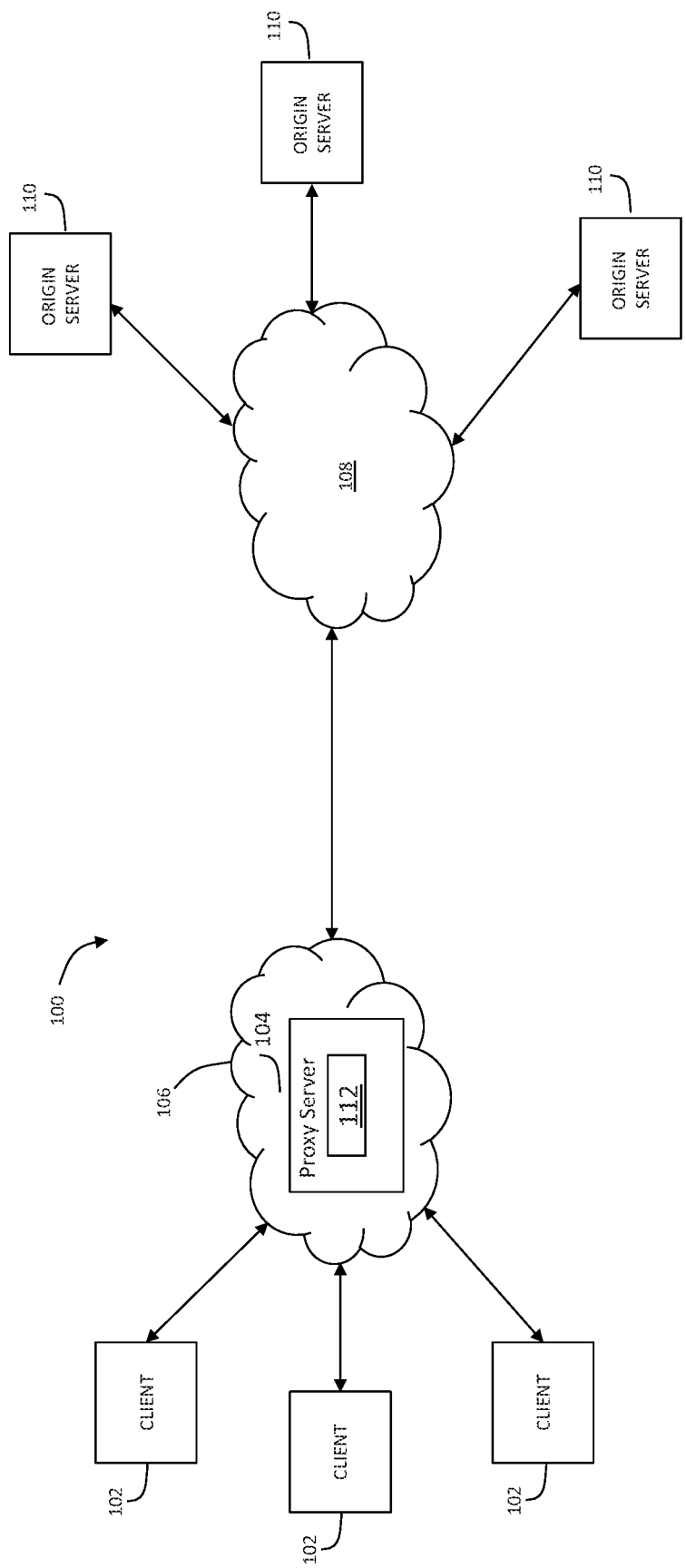
FIG. 1 is a schematic illustration of a content delivery system.

FIG. 1 depicts a content delivery system 100 in accordance with an embodiment of the invention. As described in more detail below, the content delivery system 100 includes a plurality of client devices 102, an intermediate network entity 104, an access network 106, a data network 108 and a plurality of origin servers 110.

A client device 102 is any networked device including, without limitation, a mobile phone, a smart phone, a personal digital assistant (PDA), a tablet, a set-top box, a video player, a laptop, or a personal computer (PC). In one embodiment, a client device 102 is a wireless device that can support at least one of various different radio frequency (RF) communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE) and IEEE 802.16 standards bodies.

Although some wireless communications protocols are identified herein, it should be understood that the present disclosure is not limited to the cited wireless communications protocols. In another embodiment, a client device 102 is a wired device that communicates with the intermediate network device 104 through a communication interface, such as analog modem, ISDN modem or terminal adapter, DSL modem, cable modem, Ethernet/IEEE 802.3 interface, or a combination thereof. In another embodiment, a client device 102 is connected to the intermediate network device 104 via a combination of wireless and wired communication interfaces.

In this example, the intermediate network entity is a proxy server 104 in the data communications path between the client devices 102 and the origin servers 110. In one embodiment, the proxy is a transparent proxy that passes requests and responses (e.g., HTTP requests and responses) between client devices such as a client device 102 and host servers such as an origin server 110 without modifying the requests and responses. A proxy that simply passes requests and responses is often referred to as a gateway or tunneling proxy. In another embodiment, the proxy is a non-transparent proxy that can modify requests and responses between client devices and host servers in order to provide additional services. For example, a non-transparent proxy may provide media caching services, group annotation services, media type transformation services, or protocol reduction services.

In one embodiment, the proxy server 104 is part of the access network 106, which provides a communications interface for the client devices 102 to access the origin servers 110 via the data network 108 which may be, for example, the Internet or an intranet. Typical access networks include wireless service provider networks (e.g., that offer 3G, 4G and/or WiFi access) and Internet Service Providers (ISPs, e.g., that offer dial-up, DSL, and cable modem access). A private enterprise network can also serve as the access network if client devices within the private enterprise network can access the Internet through the private enterprise network.

In one embodiment, the access network 106 is a wireless service provider network that provides a wireless communications interface for the client device. The wireless service provider network is accessible on a subscription basis (e.g., prepaid or post-paid) as is known in the field. In an embodiment, the wireless service provider network is a closed domain that is accessible only by a subscriber (e.g. a user of the user device) that is in good standing with the operator of the wireless service provider network. Accordingly, as is well known in the field, amongst other components, the access network may 106 include a radio access network (not shown) and an Internet gateway (not shown). The radio access network includes one or more base stations to facilitate communications among wireless devices that are within a communication range of the base stations.

Each base station has at least one RF transceiver and the base stations communicate with the wireless devices using RF communication signals. The radio access network facilitates network communications among multiple wireless devices within the same wireless service provider network and between wireless devices in other wireless service provider networks and provides interfaces to facilitate communications with other entities, such as a Public Switched Telephone Network (PSTN), a Wide Area Network (WAN), the Internet, Internet servers, hosts, etc., which are outside of the wireless service provider network.

In an embodiment, the wireless service provider network is operated by a single wireless service provider, such as, for example, AT&T, VERIZON, T-MOBILE, and SPRINT. The Internet gateway (not shown) of the access network provides a gateway for communications between the client device 102 and Internet-connected hosts and/or servers, which can also be referred to as the "cloud." The Internet gateway may include a Serving General Packet Radio Service (GPRS) Support Node (SGSN) and a Gateway GPRS Support Node (GGSN). In this way, the access network 106 provides access to the Internet for its subscribers.

The origin servers 110 can be any devices or systems that host digital content, which can be stored in various formats, such as video files, audio files, and/or text files. In one embodiment, an origin server 110 is an Internet-connected host or server that hosts Internet accessible content elements. The origin server may be a web server that can be accessed via, for example, HTTP, Internet Message Access Protocol (IMAP), or File Transfer Protocol (FTP). A content element is any set of digital data suitable for transfer in a networked environment, such as video files, markup language files, scripting language files, music files, image files or any other type of resource that can be located and addressed through, for example, the Internet.

At least one of the origin servers 110 makes available a live multimedia presentation, for example a video presentation or other content, using Live adaptive bitrate streaming, for example, HTTP adaptive streaming. Accordingly, an origin server 110 makes available content that is divided into a plurality of segments or portions with each segment or portion being available at different resolutions or quality levels.

The proxy server 104 comprises a data flow monitoring and control component 112 that monitors a data flow between a client 102 and an origin server 110 that passes through the proxy server 104. The data flow may comprise a series of data requests, for example, Application Layer (known as Layer 7 in the Open Systems Interconnection (OSI) model) protocol (e.g. HTTP or HTTPs) requests sent from a client 102 to an origin server 110 and a corresponding series of data responses, for example, Layer 7 responses sent back from the origin server 110 to the client 102.

In one example, the monitoring and control component 112 is able to monitor the data flow at the transport layer (i.e. Layer 4 in the OSI model) and is capable of identifying that the data flow is a live ABR streaming data flow.

Data Flow Models for VOD ABR Streaming and Live ABR Streaming

Figure 2:
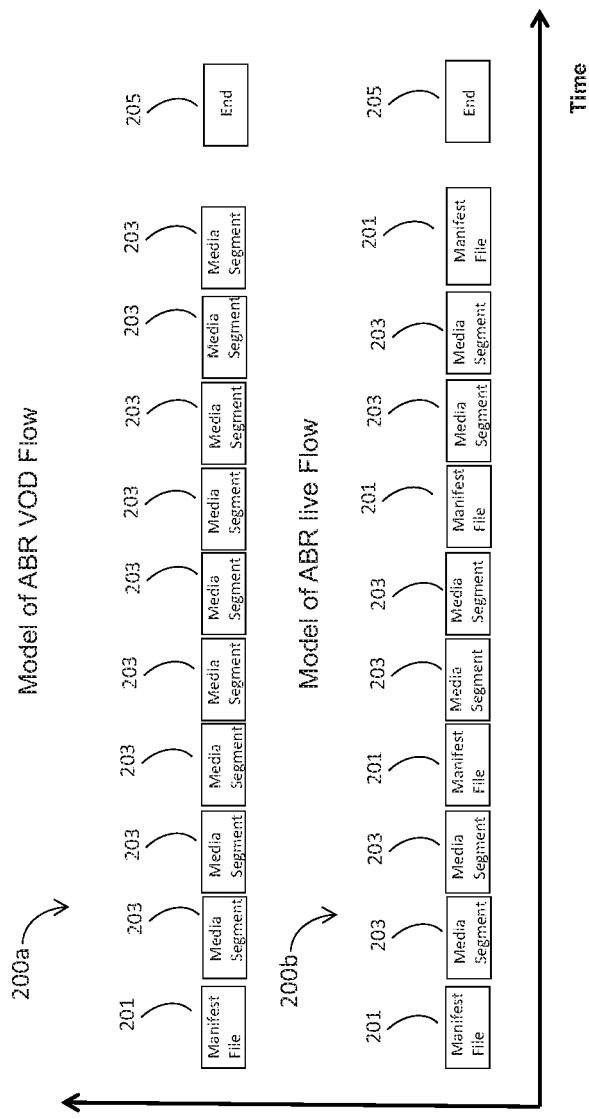
FIG. 2 is a schematic illustration of models of an ABR VoD flow and ABR Live flow.

FIG. 2 illustrates a data flow model for the data requested by and downloaded to a client (not illustrated in the Figure) in the case of VOD ABR streaming and in the case of Live ABR streaming.

The upper section of FIG. 2 illustrates a data flow 200*a* received at the client when the data flow 200*a* comprises a VOD ABR stream. The data flow 200*a* comprises a manifest file 201, which is initially downloaded by the client, followed by a sequence of video segments 203 download by the client using information contained in the manifest file 201.

The lower section of FIG. 2 illustrates a data flow 200*b* received at the client when the data flow 200*b* comprises a live ABR stream. The data flow 200*b* is initially matches that of the data flow 200*a* in that it comprises an initial manifest file 201 followed by a sequence of video segments 203 download by the client using information contained in the initial manifest file 201. Subsequently, the data flow 200*b* comprises updated manifest files 201, each containing information on newly available video segments, which are periodically downloaded by the client and are interspersed with video segments 203.

Nearly all live ABR streams will follow the pattern of having multiple, relatively small, manifest files interspersed with multiple, relatively large, video segments. A HTTP response that carries a manifest file typically has a data size in the range 1000 to 3000 Bytes whereas a HTTP response that carries an ABR video segment has a much larger data size, typically in the range 102401 Bytes to 1048577 Bytes depending upon the duration and resolution of the segment.

As will be explained in greater detail below, the monitoring and control component 112 monitors data flows flowing through the proxy server 104 and identifies a data flow as being a live ABR stream in response to determining that a sequence of responses in the data flow has a pattern that is consistent with the expected pattern of a live ABR stream.

Split TCP Connection Between a Client and a Server

Figure 3:
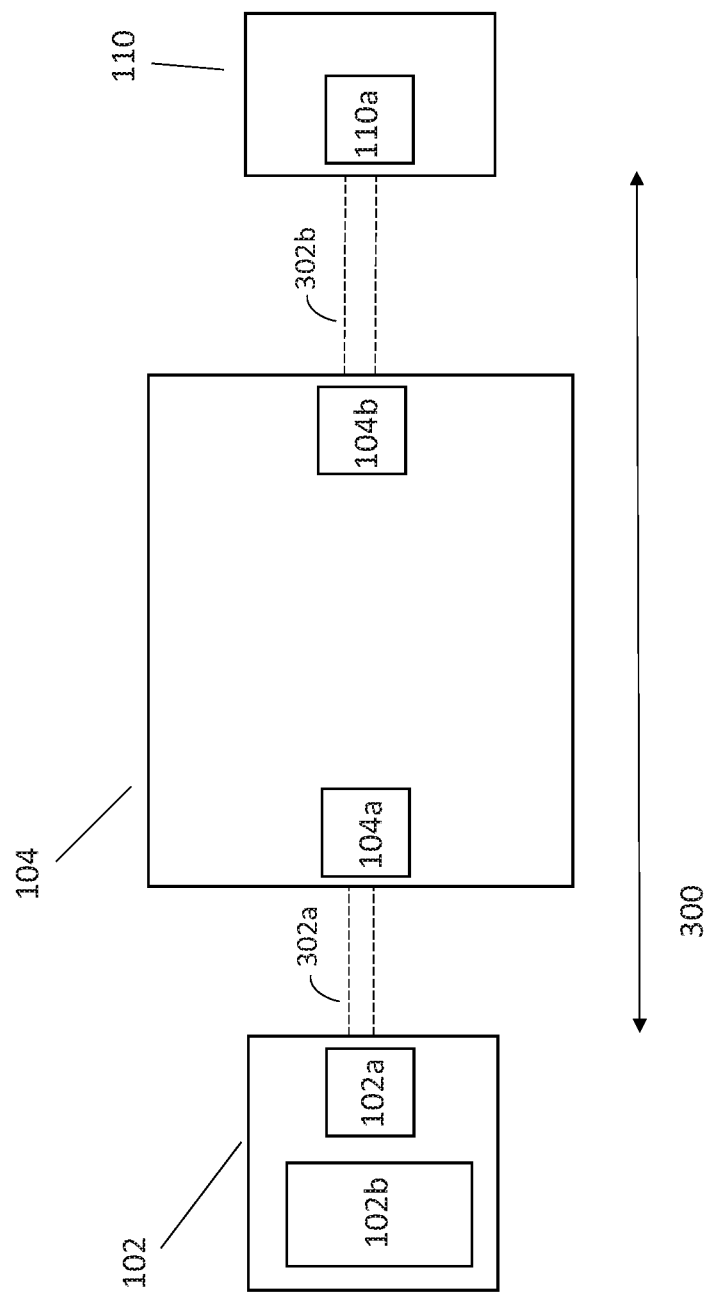
FIG. 3 is a schematic illustration of a split TCP connection between a client and an origin server via an intermediate server.

In the examples that will be described below, as is illustrated in FIG. 3, a client device 102 communicates with any given server 110 via a transport layer connection 300, for example a TCP connection, that is split in two at the proxy server 104. The split TCP connection 300 comprises a first TCP connection 302a between the client device 102 and the proxy server 104 and a second TCP connection 302b between the proxy server 104 and the origin server 110. The first TCP connection 302a is defined by a client side TCP socket 102a at the client device 102 opened by a client application 102b, and a client side socket 104a, at the proxy server 104, opened by the proxy server 104. The second TCP connection 302b is defined by a server side TCP socket 104b, at the proxy server 104, opened by the proxy server 104 and a server socket 110a, at the origin server 110, opened by the origin server 110. The split TCP connection 204a, 204b as a whole is defined by the combination of the client socket at the client device 102 and the server socket at the content server 110.

As will be appreciated by those skilled in the art, as is standard in the field, the first TCP connection 302a between the client 102a and the proxy server 104 is established using a TCP 3-way handshake (not illustrated). This TCP handshake comprises a SYN packet sent from the client 102a to the origin server 110 but which is intercepted by the proxy server 104, a SYN-ACK sent from the proxy server 104 to the client 102a in response to the SYN, and an ACK sent from the client 102a in response to the SYN-ACK which is also intercepted by the proxy server 104.

Similarly, the second TCP connection 304b between the proxy server 104 and the origin server 110 is established using a 3-way handshake (not illustrated). This TCP handshake 403 comprises a SYN packet sent from the proxy server 104 to the origin server 110, a SYN-ACK sent from the proxy server 104 to the origin server 110 in response to the SYN, and an ACK sent from the origin server 110 in response to the SYN-ACK.

In some examples, the connection between the client 102a and the origin server 110 is secured in accordance with a suitable security protocol, for example SSL or TLS. To that end, the client 102a and the origin server 110 exchange, over the spilt TCP connection 300, hand shake messages (not shown) in accordance with the particular security protocol that is being used. These messages pass through the proxy server 104 which may read them. Typically, the messages exchanged in a security handshake enable the client 102a and the origin server 110 to agree on a version of the protocol to use, select cryptographic algorithms, and establish a shared secret key for encrypting/decrypting the payloads of subsequent TCP segments that will later be exchanged between the two. The handshake messages may also provide the client 102a with the origin server's 110 digital certificate which the client 102a can validate in order to authenticate the origin server 110.

A client 102a and an origin server 110 typically communicate over the split TCP connection session 300 using a Layer 7 (i.e. presentation Layer) protocol, which in the case of an ABR streaming download is typically the Hypertext Transfer Protocol (HTTP) or HTTPs if the connection is secure. For convenience, as used herein, HTTP will be used to refer to both non-secure HTTP connections and secure HTTPs connections.

The client 102a sends one or more HTTP requests to the origin server 110 and for each request a corresponding HTTP response is sent in reply from the origin server 110 to the client device 102a. In the case of an ABR streaming download, a HTTP request may be for a manifest file in which case the corresponding HTTP response contains the manifest file or a HTTP request may be for a given segment of video in which case the corresponding HTTP response contains that segment of video.

As is standard in TCP/IP networks, each HTTP request and each HTTP response is transported over the split TCP connection 300 in one or more TCP segments (with each TCP segment itself being transported in one or more IP packets).

The proxy server 104 acts as a TCP proxy server which in respect of HTTP requests being sent from the client device 102 to the origin server 110 reads TCP payload data received at its client side socket 104a and writes that TCP payload data to its server side socket 104b for onwards transmission to the origin server 110 and in respect of HTTP responses being sent from the origin server 110 to the client device 102 reads TCP payload data received at its server side socket 104b and writes that TCP payload data to its client side socket 104a for onwards transmission to the client device 102.

In the examples described below, the proxy server 104 does not reassemble any of the HTTP requests or HTTP responses from the TCP payload data that makes up those HTTP requests or HTTP responses (i.e. the proxy server 104 acts as a TCP proxy).

Figure 4:
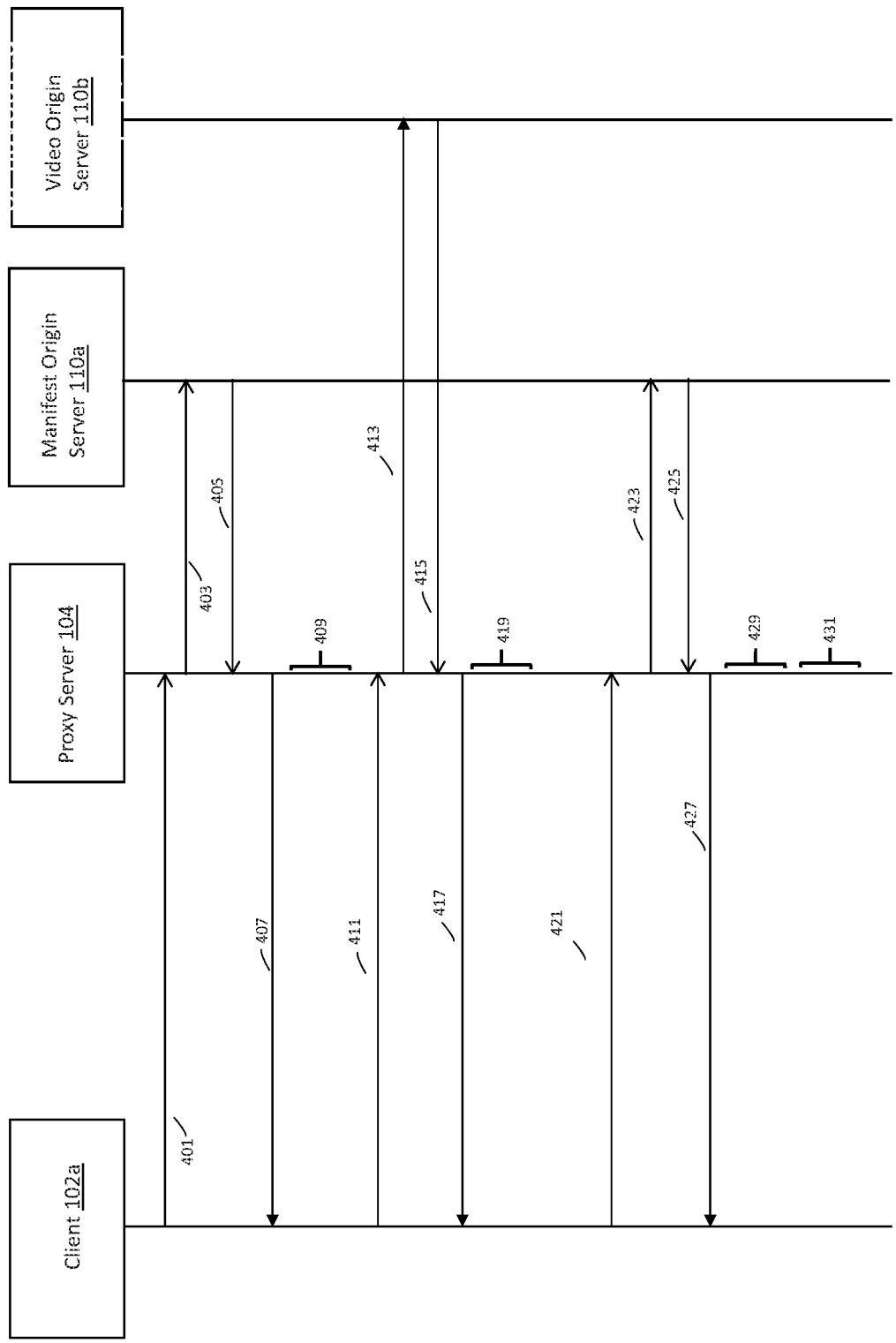
FIG. 4 is a schematic illustration of an exchange of messages in an example embodiment of the invention.

Monitoring Messages Exchanged Between a Client and Content Servers in a Data Flow and Identifying that Data Flow as a Live ABR Stream Referring now to FIG. 4, there is illustrated an exchange of Layer 7 messages between a client 102a, a proxy server 104, a first origin server 110a and a second origin server 110b in a dataflow of a first example.

In this example, as is often the case in practice, a provider of a live ABR video presentation makes available a manifest file for that live ABR video presentation at a first origin server 110a and makes available the corresponding video content for that live ABR video presentation at a different second origin server 110b. It should be appreciated, however, that the provider may alternatively make the manifest file and the corresponding video content available at the same origin server (e.g. within the same domain).

The client 102a, for example a browser or a dedicated video playing app, running at a client device periodically requests the manifest file for the live ABR video presentation from the first origin server 110a and video segments for the live ABR video presentation from the second origin server 110b.

As described in FIG. 2, the client 102a communicates with the first origin server 110a over a TCP connection that is split at the proxy server 104 and likewise with the second origin server 110b over another TCP connection that is also split at the proxy server 104.

At step 401, the client 102a sends a HTTP request for an ABR manifest file to the manifest origin server 110a. This may occur, for example, in response to a user of the client 102a selecting to view a Live ABR presentation by activating a link (e.g. clicking) displayed by the client 102a on the display of a client device 102. The proxy server 104 receives the HTTP request and forwards it, at step 403, to the manifest origin server 110a.

At step 405, manifest origin server 110a sends a HTTP response that includes the ABR manifest file to the client 102a. The proxy server 104 receives the HTTP response and forwards it, at step 407, to the client 102a.

The proxy server 104 maintains a session cache for the client 102a and records in the session cache that the client 102a has sent a request to the domain of the manifest origin server 110a and that a corresponding response has been received from manifest origin server 110a. Information stored in the session cache regarding the domain of the manifest origin server 110a can be indexed using the destination IP address and port of the manifest origin server 110a.

In one example, the proxy server 104 further maintains a first file containing a list of domains that are known to provide ABR manifest files. The proxy server 104 obtains the domain of the manifest origin server 110a and performs a look up in the file to determine if that domain is listed or not. If the domain is listed in the file, the proxy server 104 determines that the client 102a is communicating with a domain known to provide ABR manifest files. The proxy server 104 updates the session cache for the client 102a in respect of the domain of the manifest origin server 110a to indicate that the domain is one known to provide ABR manifest files. Examples of ways in which the proxy server 104 may obtain the domain of the manifest origin server 110a using one or more messages sent by the client 102a will be explained below.

The proxy server 104 determines the data size of the response when the response is received from the manifest server 110a and is forwarded to the client 102a and, at step 409, the proxy server 104 adds an entry into the client's 102a session cache indicating the data size of the response. In one example, as will be explained below, the proxy server 104 may determine the data size of the response by the monitoring and control component 112 monitoring the response at Layer 4 as it passes through the proxy server 104 and counting the number of Bytes in the response.

At step 411, the client 102a sends a HTTP request for an ABR segment, indexed in the manifest file, to the video origin server 110a. The proxy server 104 receives the HTTP request and forwards it, at step 413, to the video origin server 110b.

At step 415, the video origin server 110b sends a HTTP response that includes the requested ABR segment to the client 102a. The proxy server 104 receives the HTTP response and forwards it, at step 417, to the client 102a.

The proxy server 104 records in the session cache that the client 102a has sent a request to the domain of the video origin server 110b and that a corresponding response has been received from the video origin server 110b. Information stored in the session cache regarding the domain of the video origin server 110b can be indexed using the destination IP address and port of the video origin server 110b.

In one example, the proxy server 104 further maintains a second file containing a list of domains that are known to provide ABR video segments. The proxy server 104 obtains the domain of the video origin server 110b and performs a look up in the second file to determine if that domain is listed or not. If the domain is listed in the second file, the proxy server 104 determines that the client 102a is communicating with a domain known to provide ABR video segments. Examples of ways in which the proxy server 104 may obtain the domain of the video origin server 110b using one or more messages sent by the client 102a will be explained below.

The proxy server 104 determines the data size of the response when the response is received from the video origin server 110b and forwarded to the client 102a and, at step 419, the proxy server 104 adds an entry into the client's 102a second session cache of the domain of the video origin server 110b indicating the data size of the response. As already mentioned above, in one example, as will be explained below, the proxy server 104 may determine the data size of the response by the monitoring and control component 112 monitoring the response at Layer 4 as it passes through the proxy server 104 and counting the number of Bytes in the response.

Steps 417 to 419 are repeated in respect of each video segment, listed in the manifest file, which is downloaded by the client 102a.

At step 421, the client 102a again sends a HTTP request for the ABR manifest file to the manifest origin server 110a. The proxy server 104 receives the HTTP request and forwards it, at step 423, to the manifest origin server 110a.

At step 425, the manifest origin server 110a sends a HTTP response that includes the latest version of ABR manifest file to the client 102a. The proxy server 104 receives the HTTP response and forwards it, at step 427, to the client 102a.

Again, the proxy server 104 measures the data size of this response and, at step 429, the proxy server 104 updates the client's 102a first session cache of the domain of the manifest origin server 110a to indicate the size of the response.

At step 431, the proxy server 104 determines that the pattern of the responses in the data session involving the client 102a, namely, at least two responses that each has a data size consistent with that expected of a manifest file of an ABR presentation, between which there are one or more responses that each has a data size consistent with that expected for a video segment of an ABR presentation, is consistent with a response pattern of a Live ABR streaming session and declares or classifies that the session is a Live ABR streaming session.

The proxy server 104 may update the first and second session caches for the client 102a in respect of the domains of the manifest origin server 110a and the video origin server 110b to indicate that the client 102a is in a Live ABR streaming session.

It will be understood that steps 411 to steps 417 (i.e. requesting by and downloading to the client 102a of video segments indexed in the manifest file) and steps 421 to 421 to 427 (i.e. requesting by and downloading to the client 102a of the most up to date manifest file) are then repeated until the session ends.

Having classified the dataflow in the session as being live ABR, the proxy server 104 may then optimize the dataflow in a way that is appropriate for Live ABR and/or collect analytics appropriate for Live ABR.

It will be appreciated that the sequence of steps outlined in FIG. 4 is an example only and that the order of the sequence of steps and the nature of the steps may be different in different examples.

Determining Data Size of a Layer 7 Response by Monitoring Data Flow at Layer 4

In this example, the proxy server 104 is a TCP proxy server and so the data that passes though it does so at Layer 4 (i.e. the transport layer) and that data is not re-assembled into Layer 7 HTTP requests or responses. Accordingly, the ABR monitoring and control component 112 determines the data size, or an estimate thereof, of each HTTP response by analyzing the data flow at Layer 4. Advantageously, this approach enables the download to be identified as a Live ABR download without having to inspect the headers of the Layer 7 requests or responses for information identifying the nature of the download (which would not even be possible when the requests and/or the responses are encrypted).

Figure 5:
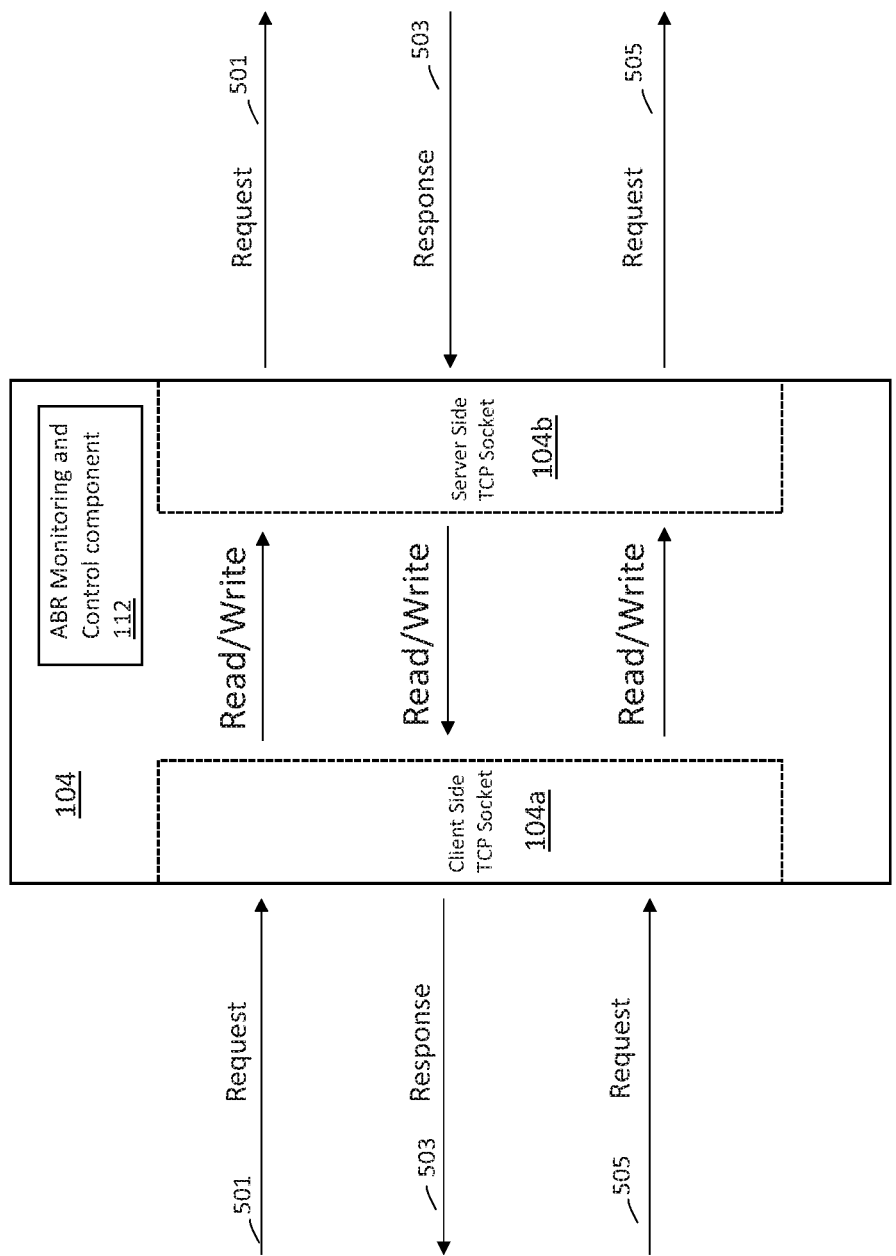
FIG. 5 is a schematic illustration of a system of monitoring data flowing at Layer 4.

FIG. 5 illustrates one example of a method by which the streaming monitoring and control component 112 may determine the data size of any given HTTP response by monitoring data flowing at Layer 4.

In this example, the proxy server 104 receives at the client side TCP socket 104a TCP payload data that makes up a first HTTP request 501 from the client (not shown in FIG. 5). In the context of FIG. 3, if the first HTTP request 501 is a request for a manifest file, then the content server it is intended for is the manifest file content server 110a and so the split TCP connection is between the client and the manifest file content server 110a. If, on the other hand, the first HTTP request 501 is a request for a video segment, then the content server it is intended for is the video content server 110b and so the split TCP connection is between the client and the video content server 110b.

It will be appreciated that, in accordance with the standard TCP/IP protocol stack, the TCP payload data arrives at the proxy server 104 over the first TCP connection 204a encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads that TCP payload data from the client side socket 104a and writes it to the server side TCP socket 104b for onwards transmission of data of the first HTTP request 501 to the origin server (not shown in FIG. 5). Again, it will be appreciated that, in accordance with the TCP/IP protocol stack, the TCP layer at the proxy server 110 will add appropriate TCP headers to the TCP payload data and pass this TCP data to the IP layer at the proxy server 104 which transmits it to the origin server encapsulated in one or more IP packets.

Subsequently, the proxy server 104 then receives at the server side TCP socket 104b TCP payload data that makes up a HTTP response 503 to the first HTTP request 501. Again, in the context of FIG. 3, if the first HTTP response 503 comprises a manifest file, then the content server it is received from is the manifest file content server 110a. If, on the other hand, the first HTTP response 503 comprises a video segment, then the content server it is received from is the video content server 110b.

Again, it will be appreciated that, in accordance with the TCP/IP protocol stack, this TCP payload data arrives at the proxy server 104 over the second TCP connection 204b encapsulated in one or more IP packets. The IP Layer at the proxy server 104 reassembles these one or more IP packets into TCP data (i.e. the IP Layer strips out the IP headers of the one or more IP packets) and presents this TCP data to the TCP layer at the proxy server 104. The TCP layer strips out the TCP headers in this TCP data to provide the TCP payload data.

The proxy server 104 reads that data from the server side TCP socket and writes it to the client side TCP socket for onwards transmission to the client 102b. Again, it will be appreciated that, in accordance with the TCP/IP protocol stack, the TCP layer at the proxy server 104 will add appropriate TCP headers to the TCP payload data and pass this TCP data to the IP layer at the proxy server 104 which it transmits it to the client application 102b encapsulated in one or more IP packets.

During this process, the monitoring and control component 112 maintains a running count of the amount data (i.e. the number of Bytes) that are read from the server side TCP socket 104b and then writing to the client side TCP socket 104a.

Then, at some subsequent point in time, the proxy server 104 receives at the client side TCP socket 104a, TCP payload data that makes up a subsequent HTTP request 505. The reception of this data at the client side TCP socket 104a indicates to the monitoring and control component 112 that the data of the first HTTP response 501 has now fully passed through the proxy server 104 (because a subsequent HTTPs request is not sent by the client application until it receives the previous response) and hence the count of the TCP payload data that makes up the first HTTP response 503 is now complete.

Alternatively or additionally, a timer is re-set each time new data arrives at the server side TCP socket 104b and if the timer times out without further data arriving at the at the server side TCP socket 104b it is determined that the TCP payload data that makes up the first HTTP response 503 is now complete.

This process may be repeated for multiple requests and responses, with the proxy server 104 in effect inferring that a set of TCP payload data arriving at the TCP client side socket and then passing through the TCP server side socket relates to a request and that all the TCP payload data that is then subsequently received at the server side TCP socket before a new set of TCP payload data is received at the client side socket 104a relates to a response to that request.

Determining Identity of a Content Server

As mentioned above, in some examples, the proxy server obtains the identity of the manifest origin server 110a or the video origin server to determine, as the case may be, whether that server is known to host ABR manifest files or ABR video content. To that end, the proxy server 104 may identify an origin server 110 in a number of different ways. In one example, the proxy server 104 identifies the origin server 110 using information read from one or more messages exchanged between the client 102a and the origin server 110 in a security protocol handshake used to secure the connection between the two.

For example, if the security Protocol used is TLS or SSL, the client sends a standard 'CLIENT HELLO' message to the origin server 110 to initiate the handshake and this CLIENT HELLO' message includes the Server Name Identifier (SNI) field which holds the Uniform Resource Locator (URL), e.g. XYZ.com, of the origin server 110. The proxy server 104 may read the SNI field when 'CLIENT HELLO' message when forwarding the 'CLIENT HELLO' message and hence obtain the URL of the origin server 110. Alternatively, the proxy server 104 may parse a message sent from the origin server 110 that includes the origin server's 110 digital certificate which in turn includes the origin server's 110 URL to obtain the URL of the origin server 110.

Alternatively, the proxy server 104 identifies the origin server 110 using information read from one or more of the messages exchanged between the client 102a and the proxy server 104 in the TCP handshake used to establish the first TCP connection 302a between the two. For example, the initial TCP SYN sent from the client device 102a to the origin server 110 but which is intercepted by the proxy server 104 is carried by an IP packet that has the IP address of the origin server 110 in its destination address field. The proxy server 104 may use this destination IP address as an identifier of the origin server 110, either directly, or by performing a reverse Domain Name Sever (DNS) lookup on the IP address to obtain the corresponding URL of the origin server 110.

Determining Live ABR Video Segment Playback Duration

The Internet draft document (HTTP Live Streaming draft-pantos-http-live-streaming-18) that describes the protocol for HTTP live streaming specifies in section 6.3.4 how frequently a client can attempt to reload the manifest file. More specifically, that section defines that when a client loads a manifest file for the first time or reloads a manifest file and determines that the manifest file has changed since the last time it is loaded the client must wait for at least the playback duration of the individual video segments of the presentation before attempting to reload the manifest file again. That is to say, for example, if the duration of each video segment is, say, 5 s, the client must wait for at least 5 s before attempting to reload the manifest file again. That section also defines that if the client reloads a manifest file and finds that it has not changed since the previous load then the client must wait for a period of one-half the playback duration of the individual video segments of the presentation before re-trying. That is to say, for example, if the duration of each video segment is, say, 5 s, the client must wait for at least 2.5 s before attempting to reload the manifest file again.

Similar constraints on the frequency with which a client may request a manifest file are defined in the document that sets out the MPEG-DASH protocol.

Accordingly, by measuring the difference between the time at which the request for the manifest file at step 401 is received and the time at which the request for the manifest file at step 421 is received, and the time differences between other successive requests for the manifest file being received, the proxy server 104 may determine an estimate for the playback duration of the video segments being downloaded. For example, if multiple such time difference measurements are performed and the proxy server 104 determines that some successive manifest file requests are received at a time difference T (e.g. 5 s) and other successive manifest file requests are received at a time difference T/2 (e.g. 2.5 s), the proxy server 104 may determine that the playback duration is T (e.g. 5 s).

It will be appreciated that the average video play back data rate of any given portion of an ABR stream is the number of bits in that portion divided by the video playback time of that portion. Accordingly, having determined the playback duration T of the video segments being downloaded, the proxy server 104 may estimate the video playback bitrate of any given segment by dividing the determined data size of the response carrying that segment by the playback duration T which is indicative of the video resolution of that segment. The proxy server 104 may monitor the estimated video playback bitrate of segments through a download session and generate an analytical record of that video playback bitrate.

Furthermore, having determined the playback duration T the proxy server 104 may more accurately optimize the ABR stream being delivered to the client.

Miscellaneous Aspects

The pattern or patterns of responses that the proxy server 104 is configured to identify as being consistent with that of a Live ABR streaming session may vary from usage to usage. For example, a pattern may comprise a set number of first response types that each has a data size consistent with that expected of a manifest file of an ABR presentation with one or more further second response types being received between each pair of the first response types, each of the second response types having a data size consistent with that expected for a video segment of a live ABR presentation.

The pattern may comprise a set number of first response types that each has a data size consistent with that expected of a manifest file of an ABR wherein the first response types are received at a substantially regular period that is consistent with the period with which client typically reloads a manifest file during a Live ABR streaming session.

In some examples, the pattern may depend upon whether or not a server providing responses has been identified, for example using techniques described above, as a server that provides either Live ABR manifest files or live ABR video content. If such an identification is made, the pattern may involve fewer responses that is the case if such an identification is not made.

In some examples, proxy server 104 may continue to monitor subsequent request and responses in the dataflow and the pattern of responses deviates from that expected for Live ABR, indicating that the dataflow has been miss-classified as Live ABR, the proxy server 104 may revoke the live ABR classification for the dataflow.

In the above described example, a manifest file is presented as being a single standalone file. In other examples, depending on the exact Live ABR protocol being used, a client may initially download a master manifest file (i.e. master playlist file) that itself references the addresses of multiple other variant-manifest files (i.e. variant-playlist files) each one being a manifest file (i.e. playlist file) for a given one of the available video segment variants. After receiving the initial master manifest file, the client the selects a variant-manifest file of a video segment variant having a quality that is appropriate for the current bandwidth available to the client. The client then requests video segments using that particular variant manifest file and reloads that particular variant manifest file as and when necessary. Later, for example if there is a change in bandwidth conditions, the client may request an alternative one of the available variant-manifest files (i.e. one that is more appropriate for the changed bandwidth conditions) and request video segments using that alternative variant manifest file and the reload that alternative variant manifest file as and when necessary. This process may repeat as when bandwidth conditions change or whenever the client determines that it needs to request segment variants of a type that it does not have a variant-manifest file for.

In the above described example, a dataflow occurs over a single split TCP connection 204a, 204b established between the client 102a and an origin server 110. It is well known that many video playback client applications running on client devices will cause multiple TCP connections to be opened with a video server when downloading a video from that video server. The multiple TCP connections may be opened sequentially e.g. a first TCP connection may be opened and segments 1 and 2 of the video downloaded over it before the connection is closed and then a second TCP connection is then opened and segments 3 and 4 of the video downloaded over it before the connection is closed and so on.

Accordingly, the proxy server 104 may record the details of a split TCP connection 204a, 204b opened between the client 102a and the origin server 110 and may associate subsequently opened split TCP connections that have the same IP quadruplet (i.e. client IP address and TCP port, server IP address and TCP port) as the first connection as all belonging to same "download event" or dataflow. By effectively aggregating all of these split TCP connections together and treating them as a single split TCP connection, the proxy server 104 is able to monitor the entire downloading of the video and can accurately classify the downloading and control it as described above.

A client application running on a client device may also cause multiple TCP connections to be opened in parallel in order to download content from a content server using all of the opened TCP connections concurrently. For example a video client application can open multiple concurrent TCP connections to a video content store if the video and audio streams of a video to be downloaded are to be downloaded separately. Alternatively, a video client application may open multiple concurrent TCP connections to a video content store in order to download video segments in parallel to increase overall throughput. As with the example of sequentially opened split TCP connections discussed above, the proxy server 104 may aggregate multiple concurrent split TCP connections together at a session level (based on their common IP quadruplet), effectively treating them as a single split TCP connection, allowing the downloading to be characterized correctly as an ABR streaming download and controlled in the manner described above.

In general, video players will use sets of parallel flows opened sequentially over the duration of the video.

In the example described above with respect to FIG. 3, a secure connection between the client 102a and the manifest file origin server 110a is established before the manifest file is downloaded (or re-downloaded) to the client 102a (i.e. the manifest file itself is encrypted). In other examples, the manifest file may be downloaded to the client 102a over a non-secure connection (i.e. the manifest file is not encrypted) and a secure connection between the client 102a and the video origin server 110b is then established for the downloading of the actual video segments.

In some examples, often, if a client and a server establish a first secure TCP connection (i.e. they set up a TCP connection and successfully perform a TLS/SSL handshake over it) and then close that first connection and immediately open a new second TCP connection, in order to secure the second TCP connection, the client and server use an abbreviated TLS/SSL handshake. The abbreviated TLS/SSL handshake re-uses the TLS/SSL session parameters established for the first connection. This avoids having to repeat a full handshake over the second connection but results in the SNI and/or server certificate not being transmitted over the new connection.

In examples where the proxy server 104 aggregates multiple split TCP connections together, effectively treating them as a single split TCP connection, the proxy server 104 is able to make use of domain information that is only obtainable from the full TLS/SSL handshake used over the initially established connection for each of the aggregated connections.

Example Configuration of a Proxy Server

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described hereinbefore.

Figure 6:
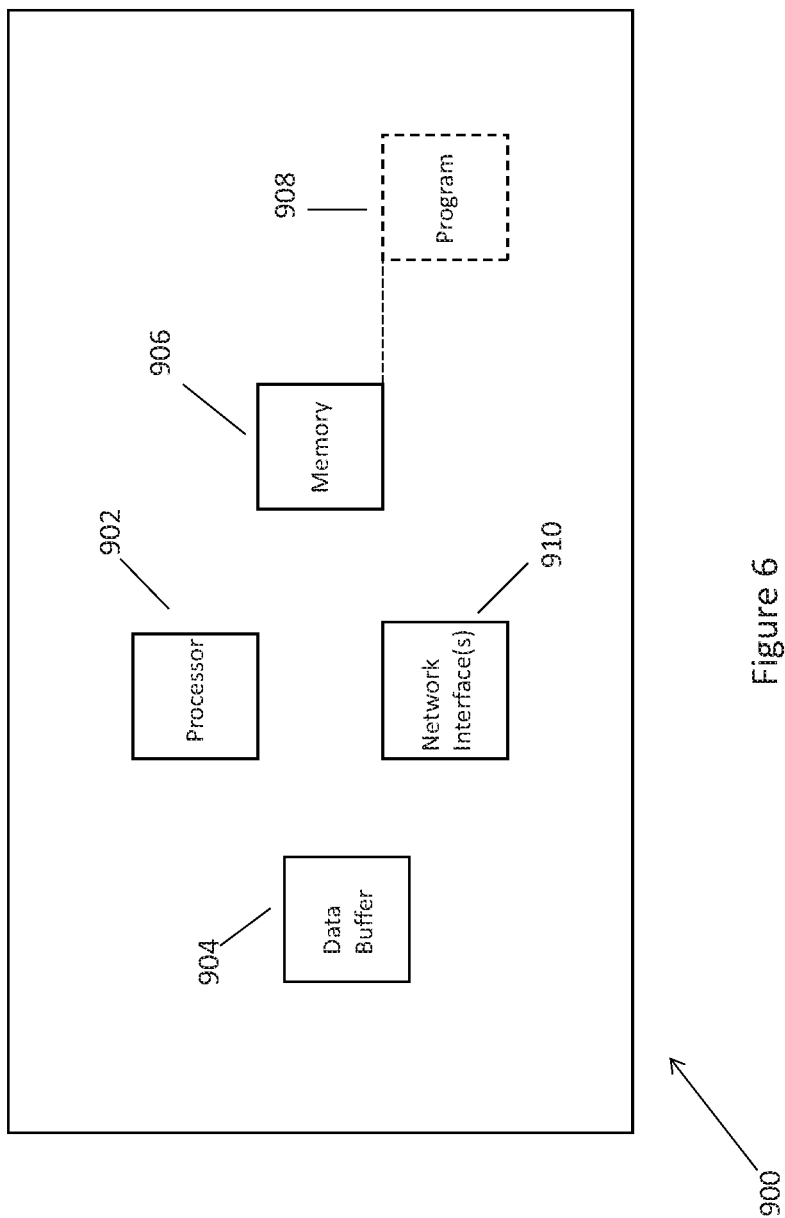
FIG. 6 is a schematic diagram of a proxy server.

Reference is now made to FIG. 6 for illustrating a simplified block diagram of a computer system 900 that is suitable for use in practicing the exemplary embodiments. In particular embodiments, the computer system 900 described in FIG. 6 is configured for communications using the Internet Protocol (IP) suite of standards. In one embodiment, the computer system 900 may be implemented as the proxy server 104.

In an embodiment, the computer system 900 includes processing means such as at least one data processor 902, storing means including a data buffer 904 and at least one computer-readable memory 906 storing computer instruction 908 including an operating system, e.g., Linux. The computer system 900 further includes communicating means such as one or more network interfaces 910 which may be used to receive and send data as described above.

The computer instructions 908 comprises a set of instructions that, when executed by the associated processor 902, enable the computer system 900 to operate in accordance with the exemplary embodiments described above. In these regards the exemplary embodiments may be implemented at least in part by computer software stored on the memory 904, or by hardware, or by a combination of tangibly stored software and hardware (and tangibly stored firmware).

Various embodiments of the computer readable memory 906 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 902 include but are not limited to general purpose computers, special purpose computers, microprocessors, digital signal processors (DSPs) and multi-core processors.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of classifying a dataflow that is being downloaded to a client over a data network from at least a first server as being a live Adaptive Bit Rate (ABR) stream, wherein the method is implemented by an intermediate network entity that is between the client and the at least a first server in the data network, the method comprising;

monitoring, at Layer 4 or below, a sequence of Layer 7 requests sent from the client and a corresponding sequence of Layer 7 responses sent to the client that pass through intermediate network entity in respect of the dataflow, wherein the monitoring at Layer 4 or below comprises measuring a data size of each Layer 7 response in the sequence of Layer 7 responses to provide a measured data size of each Layer 7 response in the sequence of Layer 7 responses;

determining, based on the measured data sizes, that the sequence of Layer 7 responses comprises a pattern of Layer 7 responses that is consistent with that expected of a live ABR stream; and classifying, in response to said determining, the dataflow as being a live Adaptive Bit Rate (ABR) stream, wherein the pattern of Layer 7 responses comprises at least two Layer 7 responses each carrying an ABR manifest file and each having a measured data size that is consistent with that of a Layer 7 response carrying an ABR manifest file.

2. The method of claim 1 wherein measuring the data size of each Layer 7 response in the sequence of Layer 7 responses comprises measuring TCP payload data received at a first TCP socket and written to a second TCP socket for transmission to the client.

3. The method of claim 1 wherein the pattern of Layer 7 responses comprises one or more Layer 7 responses each having a measured data size that is consistent with that of a Layer 7 response carrying an ABR media segment and wherein the one or more Layer 7 responses each having a measured data size that is consistent with that of a layer 7 response carrying an ABR media segment are between the at least two Layer 7 responses each having a measured data size that is consistent with that of a Layer 7 response carrying an ABR manifest file.

4. The method of claim 3, the method further comprising determining a value for a playback duration of media segments in the data flow.

5. The method of claim 4, wherein determining a value for a playback duration of media segments in the data flow comprises measuring the frequency at which the client sends Layer 7 requests that have corresponding Layer 7 responses that have data sizes that are consistent with carrying an ABR manifest file.

6. The method of claim 1, the method further comprising obtaining the identity of a server with which the client communicates to download the dataflow and using the identity to determine that the server is one known to provide ABR manifest files and/or ABR media segments.

7. The method of claim 6 wherein obtaining the identity of a server comprises inspecting a message exchanged between the client and the content server in a handshake for establishing a secure connection.

8. Apparatus for an intermediate network entity that is between a client and at least a first server in a data network, the apparatus comprising at least one processor and at least one memory including computer program code, the at least one memory and the computer program code being configured to, with the at least one processor, cause the apparatus at least to perform:

monitoring, at Layer 4 or below, a sequence of Layer 7 requests sent from the client and a corresponding sequence of Layer 7 responses sent to the client that pass through intermediate network entity in respect of a dataflow that is being downloaded to the client over the data network from at least the first server, wherein the monitoring, at layer 4 or below, comprises measuring a data size of each Layer 7 response in the sequence of Layer 7 responses to provide a measured data size of each Layer 7 response in the sequence of Layer 7 responses;

determining, based on the measured data sizes that the sequence of Layer 7 responses comprises a pattern of Layer 7 responses that is consistent with that expected of a live Adaptive Bit Rate (ABR) stream;

classifying, in response to said determining, the dataflow as being a live Adaptive Bit Rate (ABR) stream, wherein the pattern of Layer 7 responses comprises at least two Layer 7 responses each carrying an ABR manifest file and each having a measured data size that is consistent with that of a Layer 7 response carrying an ABR manifest file.

9. The apparatus of claim 8, wherein the at least one memory and the computer program code being configured to, with the at least one processor, cause the apparatus to measure the data size of each Layer 7 response in the sequence of Layer 7 responses by measuring TCP payload data received at a first TCP socket and written to a second TCP socket for transmission to the client.

10. The apparatus of claim 8, wherein the pattern of layer 7 responses comprises one or more Layer 7 responses each having a measured data size that is consistent with that of a Layer 7 response carrying an ABR media segment and wherein the one or more Layer 7 responses each having a measured data size that is consistent with that of a Layer 7 response carrying an ABR media segment are between the at least two Layer 7 responses each having a measured data size that is consistent with that of a Layer 7 response carrying an ABR manifest file.

11. The apparatus of claim 10, wherein the at least one memory and the computer program code being configured to, with the at least one processor, cause the apparatus to determine a value for a playback duration of media segments in the data flow.

12. The apparatus of claim 11, wherein the at least one memory and the computer program code being configured to, with the at least one processor, cause the apparatus to determine the value for a playback duration of media segments in the data flow by measuring the frequency at which the client sends Layer 7 requests that have corresponding Layer 7 responses that have data sizes that are consistent with carrying an ABR manifest file.

13. The apparatus of claim 8, wherein the at least one memory and the computer program code being configured to, with the at least one processor, cause the apparatus to obtain the identity of a server with which the client communicates to download the dataflow and to use the identity to determine that the server is one known to provide ABR manifest files and/or ABR media segments.

14. The apparatus of claim 13 wherein the at least one memory and the computer program code being configured to, with the at least one processor, cause the apparatus to obtain the identity of the server by inspecting a message exchanged between the client and the content server in a handshake for establishing a secure connection.

15. A non-transitory computer readable storage medium comprising a set of computer readable instructions, which, when executed by a processing system at an intermediate network entity that is between a client and at least a first server in a data network, causes the processing system to implement a method comprising at least the steps of:

monitoring, at Layer 4 or below, a sequence of Layer 7 requests sent from the client and a corresponding sequence of Layer 7 responses sent to the client that pass through intermediate network entity in respect of a dataflow that is being downloaded to the client over the data network from at least the first server, wherein the monitoring at Layer 4 or below comprises measuring a data size of each Layer 7 response in the sequence of Layer 7 responses to provide a measured data size of each Layer 7 response in the sequence of Layer 7 responses;

determining, based on the measured data sizes, that the sequence of Layer 7 responses comprises a pattern of Layer 7 responses that is consistent with that expected of a live Adaptive Bit Rate (ABR) stream; and classify, in response to said determining, the dataflow as being a live Adaptive Bit Rate (ABR) stream, wherein the pattern of Layer 7 responses comprises at least two Layer 7 responses each carrying an ABR manifest file and each having a measured data size that is consistent with that of a Layer 7 response carrying an ABR manifest file.

* * * * *